United States Patent
Ghosh et al.

(10) Patent No.: US 11,169,934 B2
(45) Date of Patent: Nov. 9, 2021

(54) SYSTEMS, METHODS AND APPARATUS FOR LOW LATENCY MEMORY INTEGRITY MAC FOR TRUST DOMAIN EXTENSIONS

(71) Applicant: Intel Corporation, Santa Clara, CA (US)

(72) Inventors: Santosh Ghosh, Hillsboro, OR (US); Kirk Yap, Westborough, MA (US); Siddhartha Chhabra, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 168 days.

(21) Appl. No.: 16/021,496

(22) Filed: Jun. 28, 2018

(65) Prior Publication Data

US 2019/0042475 A1    Feb. 7, 2019

(51) Int. Cl.
*G06F 12/14* (2006.01)
*H04L 9/32* (2006.01)
*H04L 9/06* (2006.01)

(52) U.S. Cl.
CPC ........ *G06F 12/1408* (2013.01); *H04L 9/0643* (2013.01); *H04L 9/3239* (2013.01); *H04L 9/3242* (2013.01); *G06F 2212/1052* (2013.01); *H04L 2209/12* (2013.01)

(58) Field of Classification Search
CPC .......... G06F 21/64; G06F 17/30; G06F 21/72; G06F 12/14; G06F 12/1408; H04L 9/32; H04L 9/06; H04L 9/0643; H04L 9/3239; H04L 9/3242
See application file for complete search history.

(56) References Cited

U.S. PATENT DOCUMENTS

| | | | |
|---|---|---|---|
| 2014/0082370 A1* | 3/2014 | Fernandez Gutierrez | G06F 12/1408 713/190 |
| 2014/0237611 A1* | 8/2014 | Dent | G06F 21/64 726/26 |
| 2016/0125040 A1* | 5/2016 | Kheterpal | G06Q 20/3827 707/776 |
| 2017/0272251 A1* | 9/2017 | Osheter | H04L 63/061 |
| 2017/0302440 A1* | 10/2017 | Agrawal | H04L 9/3239 |

* cited by examiner

*Primary Examiner* — Thanhnga B Truong
(74) *Attorney, Agent, or Firm* — Spectrum IP Law Group LLC

(57) ABSTRACT

The disclosed embodiments generally relate to methods, systems and apparatuses to authenticate instructions on a memory circuitry. In an exemplary embodiment, the disclosure relates to a computing device (e.g., a memory protection engine) to protect integrity of one or more memory circuitry. The computing device may include: a key-hash operator configured to provide a Message Authentication Code (MAC) for a secure Hash Algorithm (SHA) as a function of a hash-key, MAC-key, metadata and data; a multi-round (MR) circuitry configured to receive the MAC from the key-hash operator and to compute substantially all SHA round-functions during each clock cycle, the multi-round circuitry further comprising combination logic to process all sub-round functions of the SHA function substantially simultaneously; and a Memory Integrity Pipeline (MIP) engine to compute a hash digest, the hash digest further comprising a MAC key, a metadata and the cache line data; the MIP further comprising an input prep logic, an SHA pipeline logic and an MAC validation logic.

12 Claims, 7 Drawing Sheets

SYSTEMS, METHODS AND APPARATUS FOR LOW LATENCY MEMORY INTEGRITY MAC FOR TRUST DOMAIN EXTENSIONS

FIELD

The present disclosure generally relates to systems, methods and systems for memory integrity protection. More specifically, the disclosed embodiments provide cryptographically-secure design for Memory Integrity Protection (MIP) for Trust Domain Extensions (TDX). The disclosed embodiments may be applied to low-latency and small die-area memory circuitries.

BACKGROUND

Cloud security providers (CSPs) are driven by their customers' security requirements. CSPs require cryptographic isolation for the customer workloads running on their platforms. For example, certain CSPs have announced SME (Secure Memory Encryption) and SEV (Secure Encrypted Virtualization) to meet these requirements for the cloud providers.

Trust Domain Extensions is a cryptographically secure virtualization solution that provides isolation for customer workloads in a cloud environment using a Multi-Key Total Memory encryption Engine (MKTME). Total memory encryption (TME) is a planned x86 instruction set extension for a full physical memory encryption for DRAM and NVRAM with a single ephemeral key. TME can be further extended with the MKTME extension which builds on TME and adds support multiple encryption keys. While TDX provides cryptographic isolation and confidentiality guarantees, an attacker with physical access can still conduct active attacks in which encrypted data in memory can be modified and subsequently consumed without detection.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Figure 1:
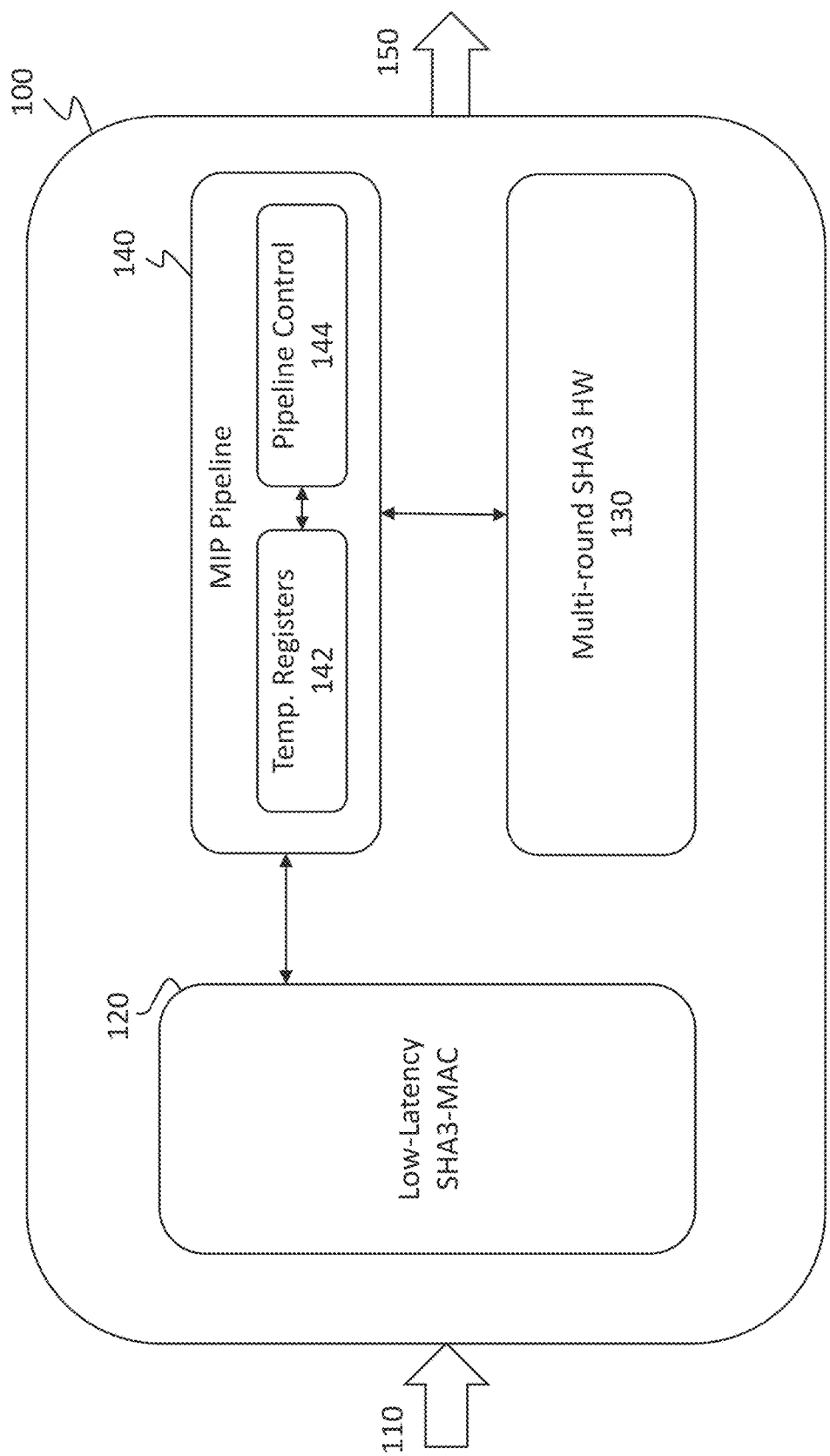
FIG. 1 schematically illustrates an MIP engine according to one embodiment of the disclosure.

FIG. 1 illustrates an exemplary embodiment of a TDX memory integrity engine according to one embodiment of the disclosure. Integrity engine 100 of FIG. 1 may be implemented in hardware, software or a combination of hardware and software. Integrity engine 100 is shown as receiving data input 110 and providing output 150. Integrity engine 100 also includes low-latency MAC 120, MIP Pipeline Control 140 and multi-round Hardware 130.

Low-latency MAC may be configured to implement a keyed-hash operation on, for example, a secure hash algorithm ("SHA") function. One such example is SHA3 which is a recent SHA in the family of standards.

In one embodiment, to enable TDX memory integrity, Low-latency MAC may have three elements: the MAC-key, the domain specific Metadata and the 512-bit cache-line data. The MAC-key is a secret bit-string that provides authentication of the cache line. There is no way to compute the same MAC without knowing this secret. Domain specific Metadata includes the address of the cache line data and a few processor-specific bits that identify an execution domain. Finally, the cache line is the 512-bit data of the specific address that we want to be integrity protected.

This exemplary configuration provides flexibility on sizes of the MAC key (0 to 256 bits) and the Metadata (0 to 320 bits). In an exemplary embodiment, the SHA3 hash function may be configured with 256-bit digest output that provides 128-bit post-quantum pre-image resistance. The Low-latency SHA3-MAC is defined as:

MAC=Keccak1600 (MAC-key||Metadata||Data)

where, MAC-key varies from 0 to 256 bits, Metadata varies from 0 to 320 bits and Data is 512-bit (one cache line). The Keccak1600 (SHA3) hash function may be configured with the following parameter values:

Capacity=512
Bitrate=1088
Digest size=256
Rounds=24

The 256-bit Digest (or smaller number of truncated bits with appropriate length) is used as the MAC of the cache-line which is valid only for a specific domain with associated Metadata. Based on the product constraints, the MAC can be truncated to 32, 64 or 128-bits.

Additionally, the Low-latency SHA3-MAC may be defined with following way which does not provide post-quantum security. The Keccak1600 function in this case is defined with 128-bit MAC-key, 128-bit Metadata and 512 or 1024-bit Data (1 or 2 cache lines). It configures Keccak1600 with Capacity=256, Bitrate=1344, Digest size=128 and Rounds=24. The final MAC can be any number of truncated bits from the Digest.

The Multi-round HW 130 may include a 1600-bit parallel data path for computing multiple SHA3 round-functions within one clock cycle to keep up MIP latency requirement. It is flexible to accommodate variable number of SHA3 rounds based on operating clock frequency and power budget. For example, for 1.5 GHz & 0.85V target, the Multi-round SHA3 HW 130 can accommodate four SHA3 rounds, which provides 4× lower latency compared to traditional one round approach.

Figure 2:
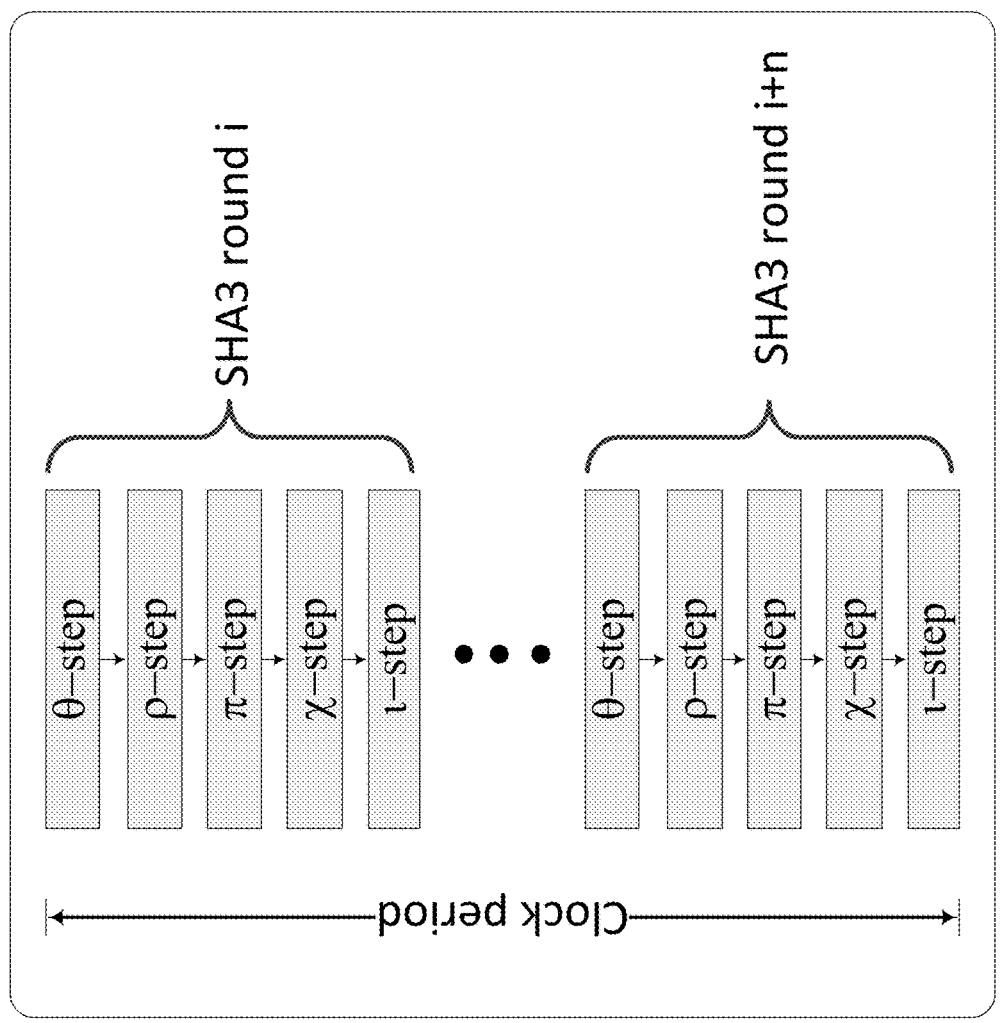
FIG. 2 depicts an exemplary top level design approach for the Multi-round HW according to one embodiment of the disclosure.

FIG. 2 depicts an exemplary top level design approach for the Multi-round HW 130 which may be configured with following two parameters to keep up the MIP latency requirements:

Process all 1600 bits of SHA3 state variables in parallel;
Include combinational logic for n (>1) SHA3 round-functions each of which has all five sub-round operations called: θ, ρ, π, χ, and ι.

All of the sub-rounds shown in FIG. 2 (i.e., SHA3 rounds i to SHA3 round i+n) can be performed in one clock cycle. This operation is particularly advantageous in providing low latency integrity check.

As latency optimization may be a primary objective for TDX, the Multi-round SHA3 HW processes all 1600 bits of SHA3 state variable in parallel. Further, each sub-round operation (i.e., θ, ρ, π, χ, and ι) may be implemented with optimal combinational logic that results in a SHA3 single-round HW block with 3× reduced die-area (for example, 15.8k gates vs 48k gates of traditional reference design). The optimized SHA3 single-round HW may have a significantly smaller input to output delay than a single clock-period that is typically used in conventional client and server platforms. This may be exploited for incorporating more than one SHA3 round-functions so that the Multi-round SHA3 HW computes them in one clock cycle. Such computation may be in one clock cycle.

Referring once again to FIG. 1, MIP Pipeline 140 may utilize the output of the Multi-round HW 130 for computing hash digest for input block composed of the MAC key, the Metadata and the Cache-line Data. Temporary registers 142 inside the MIP Engine are used to hold intermediate hash results that are computed by the Multi-round SHA3 HW. The intermediate results are reapplied on the Multi-round SHA3 HW until all SHA3 rounds are computed. The first n bits of the final SHA3 round output is used as the n-bit SHA3 digest.

The MIP Engine 100 can provide a design with 230k gates die-area. It may include 6 clock cycles latency for a MAC computation on 64-byte cache line which is less than the AES encryption latency (10 clock cycles) for TDX MKTME solution. Therefore, MIP solution 100 provides integrity protection for TDX without any additional latency overhead on top of its confidentiality protection. The MIP solution for TDX is TR for Sapphire Rapids 10 nm server product.

Figure 3:
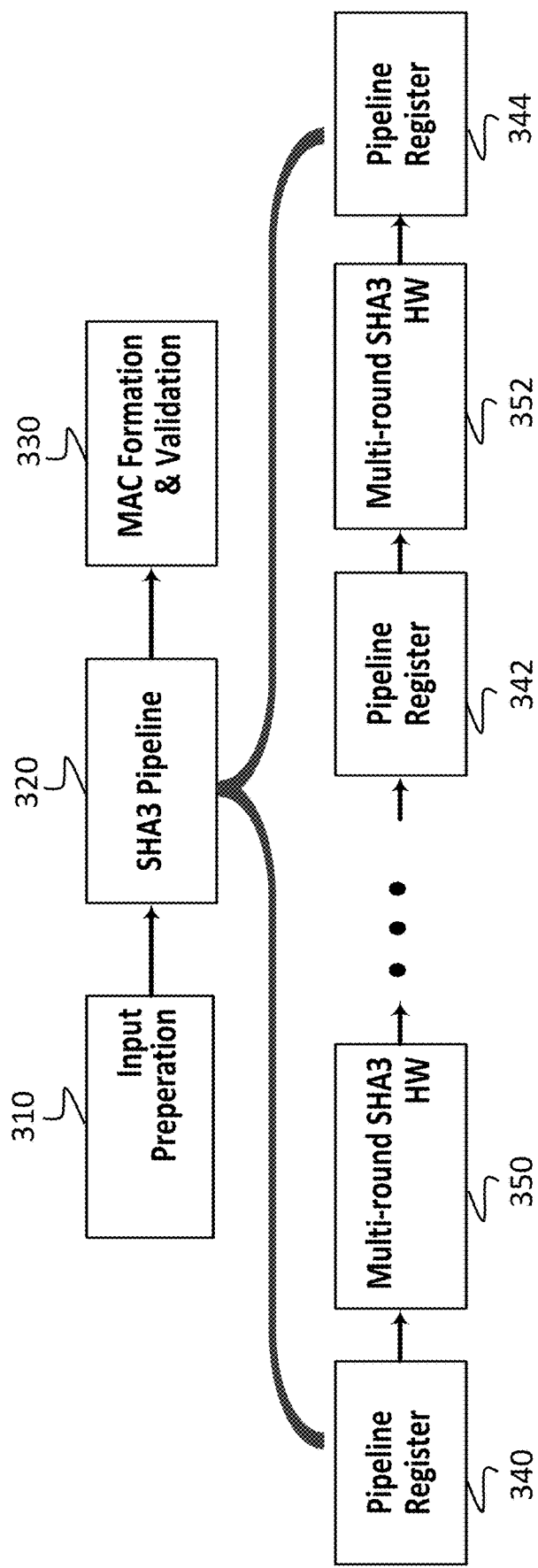
FIG. 3 schematically illustrates an exemplary MIP Pipeline according to one embodiment of the disclosure.

FIG. 3 schematically illustrates an MIP Pipeline according to one embodiment of the disclosure. Specifically, FIG. 3 illustrates an MIP Pipeline which is comprised of three components: Input Preparation 310, SHA3 Pipeline 320 and MAC formation and validation 330. The Input Preparation unit 310 fetches the physical address of the cache-line and other metadata fields from the internal memory (see FIG. 4), the MAC key from the key buffer (not shown) and the cache-line data (not shown). Further, this unit concatenates them in a right order and adds a suitable padding to form a SHA3 input block with size exactly same with the Bitrate.

The SHA3 Pipeline 320 is a component of MIP Pipeline for providing integrity protection for TDX. SHA3 Pipeline 320 includes multiple Multi-round SHA3 hardware components (HWs) 350, 352 which are connected by intermediate Pipeline Registers 340, 342, 344. Each individual Multi-round SHA3 HW 350, 352 independently computes specific n-rounds of SHA3 algorithm on input data stored in its predecessor Pipeline Register. The total latency for computing one SHA3 operation depends on n. For example, for n=4, a depth-6 SHA3 Pipeline is designed which has latency of 6 clock cycles for computing SHA3 Digest from an input that was formed by the Input Preparation unit. In an exemplary TDX scenario, this depth-6 SHA3 Pipeline meets MAC computation workload without adding any overhead latency from MKTME which currently has 10 clock cycles AES latency. Further, one MIP Pipeline can be sufficient to share between read and write transactions without any performance penalty.

The MAC Formation and Validation truncates 256 (or 128)-bit SHA3 Digest to an appropriate length (k bits) string which is used as the MAC. For write transactions, it outputs final k-bit, k≤n MAC that is write into the memory along with the cache-line. For read transactions, it compares the k-bit computed MAC with the k-bit MAC, which read from memory along with the respective cache-line, and produces Valid/Invalid result.

Figure 4:
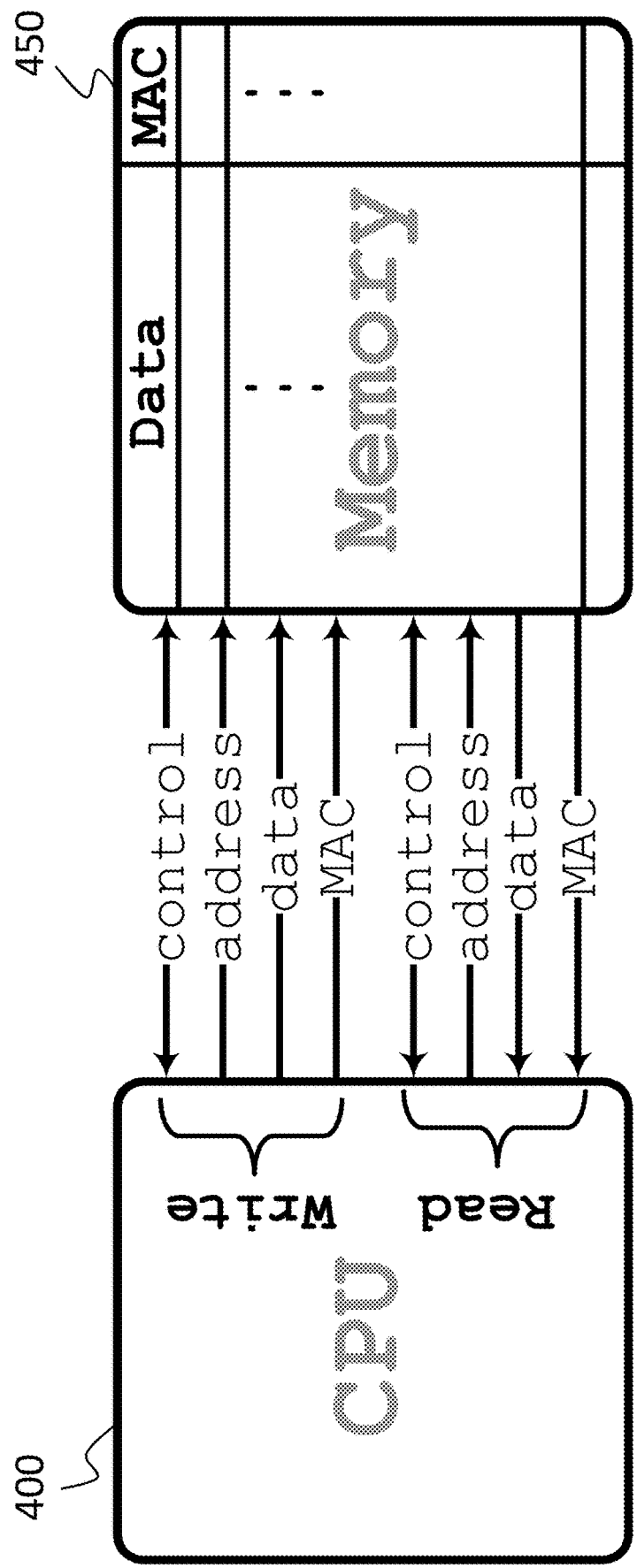
FIG. 4 depicts top level view on how CPU and memory interact with the exemplary MPI embodiments disclosed herein.

FIG. 4 depicts top level view on how a central processing unit (CPU) 400 and a memory circuitry 450 interact with the exemplary MPI embodiments disclosed herein. Data and its respective MAC value together may be written into the memory during memory write. During memory read, data and its respective stored MAC are read back from the memory as illustrated by the arrows.

Figure 5B:
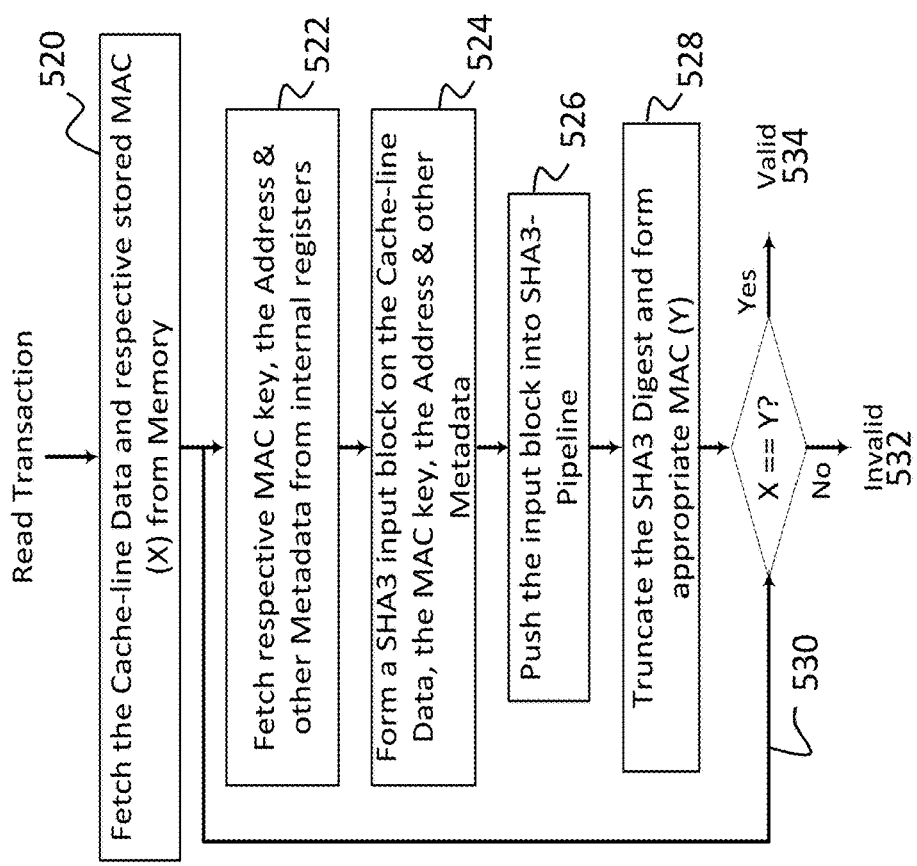
FIGS. 5A and 5B, respectively show, write and read Transactions flow for MIP solution according to one embodiment of the disclosure.
Figure 5A:
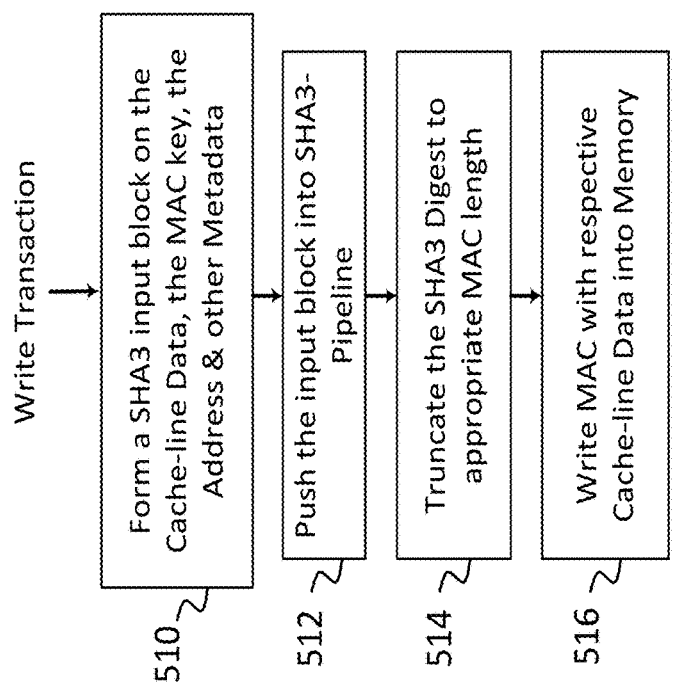

FIGS. 5A and 5B respectively show Write and Read Transactions flow for MIP solution according to one embodiment of the disclosure. An MIP Engine, similar to those described above, may be used for computing the MAC for both Read and Write memory transactions. The Write Transaction of FIG. 5A starts at step 510, where an SHA input block is formed on the cache-line data, the MAC key, the MAC key, the Address and other metadata. The SHA may be SHA3. For simplicity, the flow-diagrams of FIGS. 5A and 5B will refer to SHA3; thought it should be understood that the disclosed principles are not limited thereto and may be applied equally to other similar algorithms. At step 512, the input block is pushed into the pipeline. At step 514, the SHA3 digest is truncated to an appropriate length as discussed above. At step 516, the truncated MAC is written with respective cache-line data into a memory location(s). For ease of reference, the truncated MAC and its respective cache-line data are identified as X.

The Read Transaction of FIG. 5B starts at step 520, where the cache-line data and its respective stored MAC (i.e., X) are obtained from memory. At step 522, the respective MAC key, the Address and other Metadata are retrieved from the internal registers (i.e., temp registers 142, FIG. 1) of the low latency engine. At step 524, an SHA3 input block is formed on the cache-line data, the MAC Key, the Address and other metadata. At step 526, the input block formed at step 524 is pushed into the SHA3 pipeline. At step 528, the SHA3 input block is truncated to form an appropriate MAC. For ease of reference, the Read Transaction truncated MAC is identified as Y.

At step 530, the Write Transaction MAC (X) and the Read Transaction MAC (Y) are compared. If they are identical, the decision step 530 will authenticate a valid answer at step 534. If the validation step 530 results in an invalid (i.e., X≠Y) answer, the in-authentication is reported at step 532.

In an exemplary implementation, the Low-Latency Memory Integrity MAC disclosed herein was prototyped in Verilog RTL (as a solution for TDX). The hardware blocks were implemented on Intel's® 10 nm (p1274) technology with 0.65V-0.85V, 70° C., 1.5 MHz. The die area and timing results are tabulated in Table 1.

TABLE 1

Implementation results of Low Latency Memory Integrity MAC solution for TDX

Library: ec0_ln_p1274d1_tttt_v065_to_v085_t100_max.
Clock: 664 ps, uncertencity: 20 ps, i/o: 25 ps, library setup 31 ps

| MAC Engine | Logic stages | Timing | Cell counts | | Area/Engine [um2] | Latency | #Engines | Total Cells | | Total Area [um2] |
| --- | --- | --- | --- | --- | --- | --- | --- | --- | --- | --- |
| | | | Com | Seq | | | | Com | Seq | |
| SHA3-depth-6-Pipeline* | 34 | Met | 160012 | 9863 | 28868 | 6 | 1 | 160012 | 9863 | 28868 |
| SHA3-depth-8-Pipeline** | 20 | Met | 151910 | 13065 | 30691 | 8 | 1 | 151910 | 13065 | 30691 |

Figure 6:
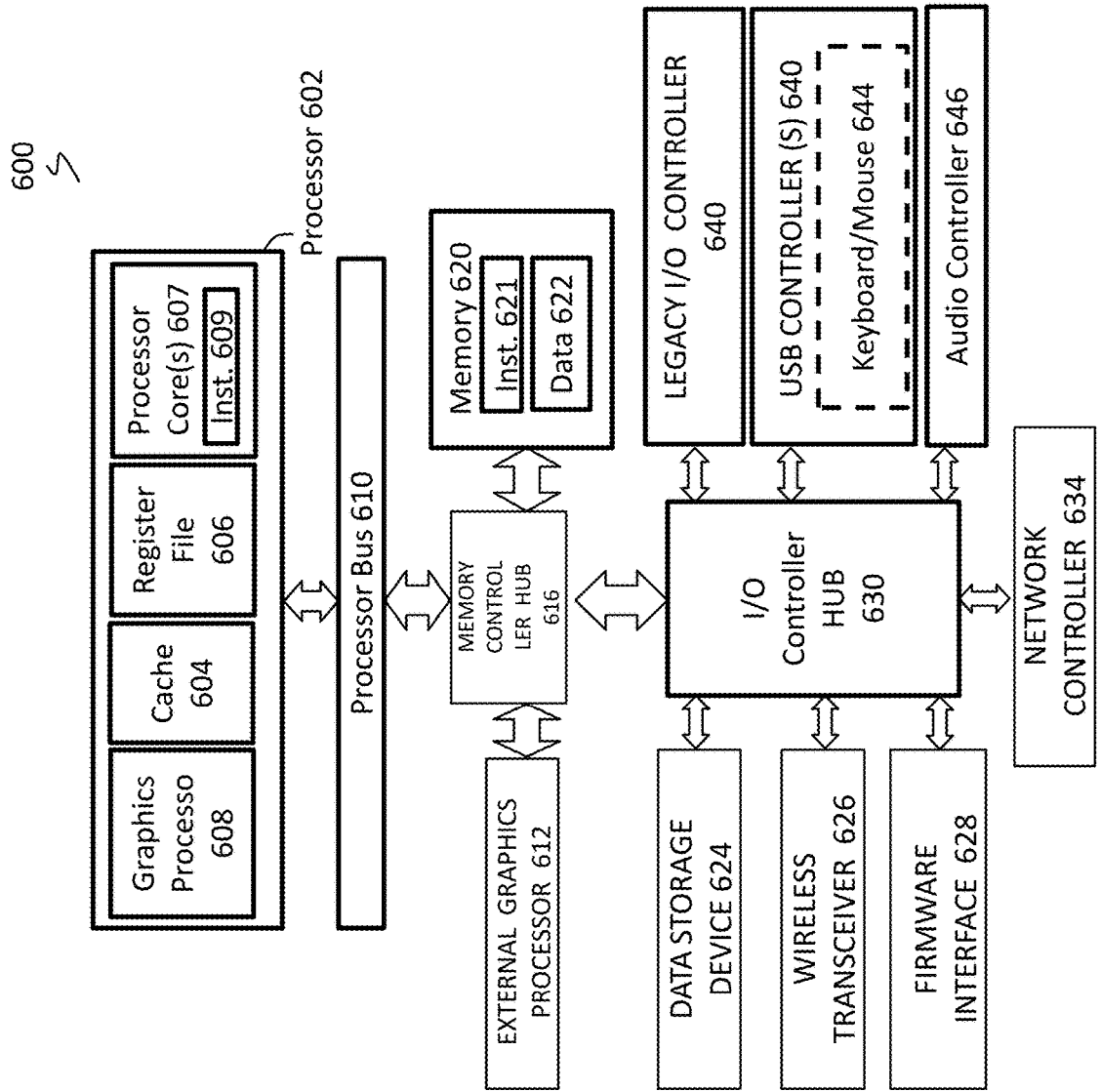
FIG. 6 is a block diagram of a processing system 600, according to an embodiment.

*4 rounds datapath in one pipe stage; depth 6 pipeline fo 24 rounds
3 rounds datapath in one pipe stage; depth 8 pipeline for 24 rounds FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600** is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 807 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random access memory (DRAM) device, a static random access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
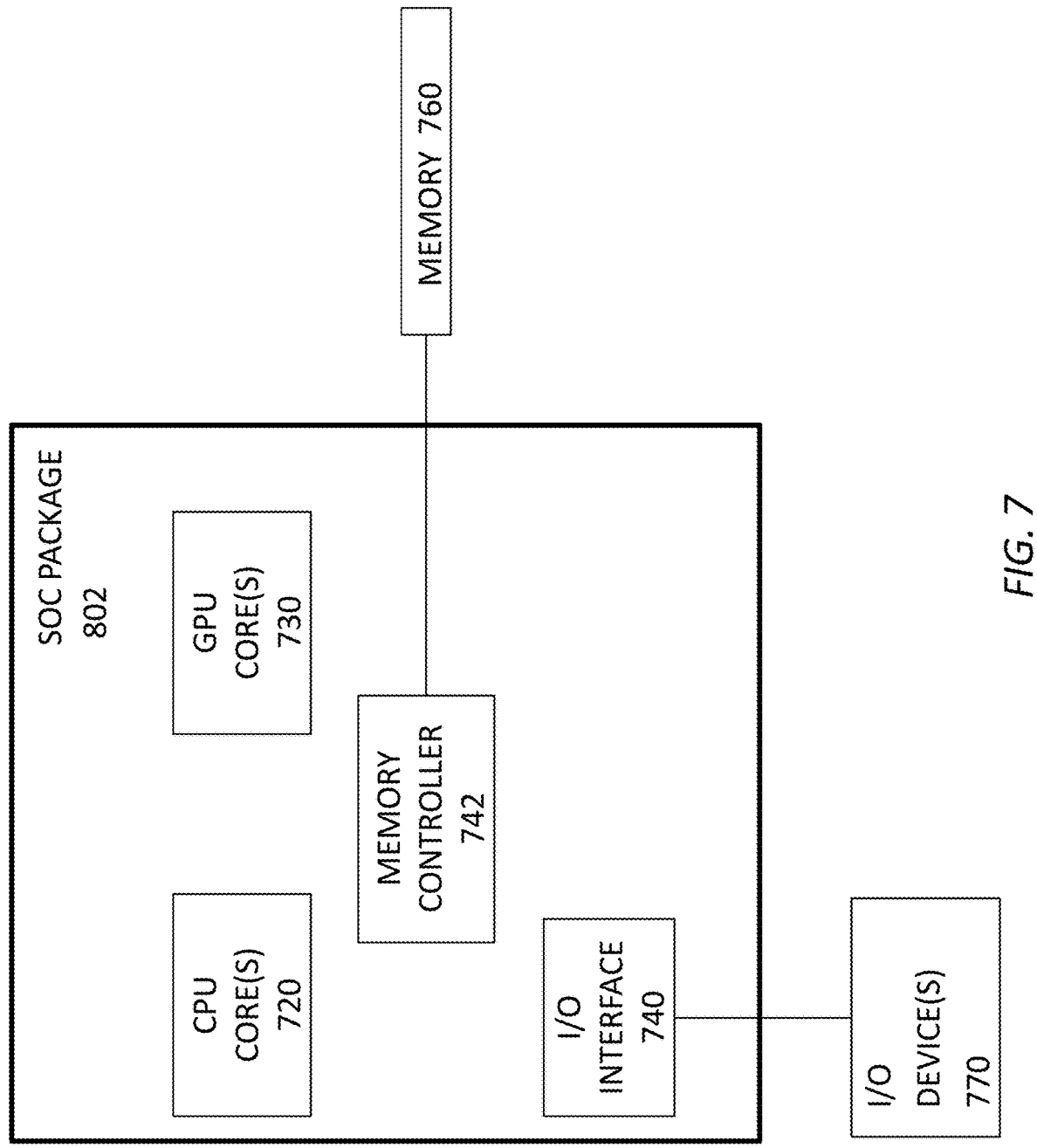
FIG. 7 illustrates a block diagram of an SOC package in accordance with an embodiment.

FIG. 7 illustrates a block diagram of an SOC package in accordance with an embodiment. As illustrated in FIG. 8, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

ADDITIONAL NOTES & EXAMPLES

The following are exemplary and non-limiting embodiments of the disclosure and are provided to further illustrates the disclosed principles and its applications.

Example 1 relates to a computing device to protect integrity of one or more memory circuitry, the computing device comprising: a key-hash operator configured to provide a Message Authentication Code (MAC) for a secure Hash Algorithm (SHA) as a function of a hash-key, MAC-key, metadata and data; a multi-round (MR) circuitry configured to receive the MAC from the key-hash operator and to compute substantially all SHA round-functions during each clock cycle, the multi-round circuitry further comprising combination logic to process all sub-round functions of the SHA function substantially simultaneously; and a Memory Integrity Pipeline (MIP) engine to compute a hash digest, the hash digest further comprising a MAC key, a metadata and the cache line data; the MIP further comprising an input prep logic, an SHA pipeline logic and an MAC validation logic.

Example 2 relates to the computing device of example 1, wherein the SHA comprises SHA3.

Example 3 relates to the computing device of example 1, wherein the low-latency MAC is configured to perform key-hash operation on an SHA3 hash function.

Example 4 relates to the computing device of example 1, wherein the MR circuitry is configured to receive the MAC from the key-hash operator and to compute substantially all SHA round-functions in parallel during one clock cycle.

Example 5 relates to the computing device of example 1, wherein the multi-round circuitry further comprises combination logic to process five sub-round operations substantially simultaneously.

Example 6 relates to the computing device of example 1, wherein the multi-round circuitry is configured to process 1600-bit parallel data path substantially simultaneously and during one clock cycle.

Example 7 relates to the computing device of example 1, wherein the multi-round circuitry is configured to compute at least four SHA round functions in one clock cycle.

Example 8 relates to the computing device of example 1, wherein the multi-round circuitry comprises a digital logic having at least 15.8k gates.

Example 9 relates to the computing device of example 1, wherein the hash-key is a function of Keccak 1600 algorithm, the metadata is in the range of about 0 to 320 bits and the data is 512 bit.

Example 10 relates to the computing device of example 1, wherein the MIP circuitry further comprises at least one temporary register to retain an intermediate hash result and a pipeline control circuitry.

Example 11 relates to the computing device of example 10, wherein the intermediate hash result is communicated to the MR circuitry.

Example 12 relates to at least one machine-readable medium comprising instructions that, when executed by computing hardware, including a processor circuitry coupled to a memory circuitry, cause the computing hardware to authenticate instruction on the memory circuitry by: performing a write operation, the write operation including: forming an SHA input block on a cache-line data, the input block formed as a function of a Message Authentication Code (MAC) key, a memory address and other metadata and the cache-line data; directing the SHA input block into a data pipeline to form a first SHA digest; truncating the first SHA digest to a first length to form a first MAC input (X); and writing the first MAC input with the cache-line data into one or more memory blocks; performing a read operation, the read operation including: obtaining the MAC key, the memory address and the at least one metadata; forming a second SHA input block on a read cache-line data as a function of the MAC key, the memory address, the at least one metadata and the cache-line that just read out from memory; directing the second SHA input block into the SHA pipeline to form a second SHA digest; truncate the second SHA digest to a second length to form a second MAC (Y); and compare the second MAC (Y) and first MAC (X) that is read out from memory with cache-line data.

Example 13 relates to the machine-readable medium of example 12, wherein the data pipeline communicates data between the circuitry and the processing circuitry.

Example 14 relates to the machine-readable medium of example 12, wherein the first length is one of 32, 64 or 128 bits.

Example 15 relates to the machine-readable medium of example 12, wherein performing the write operation further comprises obtaining the cache-line data and the first MAC input (X) from the memory.

Example 16 relates to the machine-readable medium of example 12, wherein performing the write operation further comprises obtaining the MAC key, the memory address and the at least one metadata from one or more internal registers of a memory integrity engine.

Example 17 relates to the machine-readable medium of example 12, further comprising authenticating memory integrity by comparing the first MAC input with the second MAC input (Y).

Example 18 relates to the machine-readable medium of example 17, further comprising validating memory integrity if the first MAC input (or X) and the second MAC input (or Y) are identical.

Example 19 relates to the machine-readable medium of example 12, wherein the instructions are executed on a hardware, software or a combination of hardware and software.

Example 20 relates to a method to authenticate instructions to a memory circuitry to verify memory integrity, the method comprising: performing a write operation, the write operation including: forming an SHA input block on a cache-line data, the input block formed as a function of a Message Authentication Code (MAC) key, a memory address and other metadata and the cache-line data; directing the SHA input block into a data pipeline to form a first SHA digest; truncating the first SHA digest to a first length to form a first MAC input (X); and writing the first MAC input with the cache-line data into one or more memory blocks; performing a read operation, the read operation including: obtaining the MAC key, the memory address and the at least one metadata; forming a second SHA input block on a read cache-line data as a function of the MAC key, the memory address, the at least one metadata and the cache-line that just read out from memory; directing the second SHA input block into the SHA pipeline to form a second SHA digest; truncate the second SHA digest to a second length to form a second MAC (Y); and compare the second MAC (Y) and first MAC (X) that is read out from memory with cache-line data.

Example 21 relates to the method of example 20, wherein the data pipeline communicates data between the circuitry and the processing circuitry.

Example 22 relates to the method of example 20, wherein the first length is one of 32, 64 or 128 bits.

Example relates to the method of example 20, wherein performing the write operation further comprises obtaining the cache-line data and the first MAC input (X) from the memory.

Example 24 relates to the method of example 20, wherein performing the write operation further comprises obtaining the MAC key, the memory address and the at least one metadata from one or more internal registers of a memory integrity engine.

Example 25 relates to the method of example 20, further comprising authenticating memory integrity by comparing the first MAC input with the second MAC input.

Example 26 relates to the method of example 24, further comprising validating memory integrity if the firs MAC input and the second MAC input are identical.

Example 27 relates to the method of example 20, wherein the instructions are executed on a hardware, software or a combination of hardware and software.

While the principles of the disclosure have been illustrated in relation to the exemplary embodiments shown herein, the principles of the disclosure are not limited thereto and include any modification, variation or permutation thereof.

What is claimed is:

1. A computing device to protect integrity of one or more memory circuitry, the computing device comprising:
a key-hash operator configured to provide a Message Authentication Code (MAC) for a secure Hash Algorithm (SHA) as a function of a hash-key, MAC-key, domain-specific metadata and cache-line data;
a multi-round (MR) circuitry configured to receive the MAC from the key-hash operator and to compute substantially all SHA round-functions during each clock cycle, the multi-round circuitry further comprising combination logic to process all sub-round functions of the SHA function substantially simultaneously; and
a Memory Integrity Pipeline (MIP) engine to compute a hash digest, the hash digest further comprising a MAC key, a metadata and the cache line data; the MIP further comprising an input prep logic, an SHA pipeline logic and an MAC validation logic;
wherein the computing device including key-hash operator, MR circuitry and MIP engine are implemented on a System-on-Chip;
wherein the MAC-key includes a secret bit-string that provides authentication of the cache-line data.

2. The computing device of claim 1, wherein the SHA comprises SHA3.

3. The computing device of claim 1, wherein the low-latency MAC is configured to perform key-hash operation on an SHA3 hash function.

4. The computing device of claim 1, wherein the MR circuitry is configured to receive the MAC from the key-hash operator and to compute substantially all SHA round-functions in parallel during one clock cycle.

5. The computing device of claim 1, wherein the multi-round circuitry further comprises combination logic to process five sub-round operations substantially simultaneously.

6. The computing device of claim 1, wherein the multi-round circuitry is configured to process 1600-bit parallel data path substantially simultaneously and during one clock cycle.

7. The computing device of claim 1, wherein the multi-round circuitry is configured to compute at least four SHA round functions in one clock cycle.

8. The computing device of claim 1, wherein the multi-round circuitry comprises a digital logic having at least 15.8k gates.

9. The computing device of claim 1, wherein the hash-key is a function of Keccak 1600 algorithm, the metadata is in the range of about 0 to 320 bits and the cache-line data is 512 bits.

10. The computing device of claim 1, wherein the MIP circuitry further comprises at least one temporary register to retain an intermediate hash result and a pipeline control circuitry.

11. The computing device of claim 10, wherein the intermediate hash result is communicated to the MR circuitry.

12. A System on Chip ("SoC") to protect integrity of one or more memory circuitry, the SoC comprising:
a key-hash operator configured to provide a Message Authentication Code (MAC) for a secure Hash Algorithm (SHA) as a function of a hash-key, MAC-key, domain-specific metadata and cache-line data;
a multi-round (MR) circuitry configured to receive the MAC from the key-hash operator and to compute substantially all SHA round-functions during each clock cycle, the multi-round circuitry further comprising combination logic to process all sub-round functions of the SHA function substantially simultaneously and during one clock cycle; and
a Memory Integrity Pipeline (MIP) engine to compute a hash digest, the hash digest further comprising a MAC key, a metadata and the cache line data; the MIP further comprising an input prep logic, an SHA pipeline logic and an MAC validation logic;
wherein the key-hash operator, MR circuitry and MIP engine are implemented on a unitary SoC and wherein the cache-line data is 512 bits.

* * * * *